United States Patent
Karatzis (10) Patent No.: US 10,786,978 B2
(45) Date of Patent: Sep. 29, 2020

(54) PACKAGING MATERIAL AND METHOD FOR PRODUCING A PACKAGING MATERIAL

(71) Applicant: Karatzis S.A. Industrial & Hotelier Enterprises, Heraclion (GR)

(72) Inventor: Antonios Karatzis, Heraclion (GR)

(73) Assignee: KARATZIS S.A. INDUSTRIAL & HOTELIER ENTERPRISES, Heraclion (GR)

(*) Notice: Subject to any disclaimer, the term of this patent is extended or adjusted under 35 U.S.C. 154(b) by 0 days.

(21) Appl. No.: 15/775,688

(22) PCT Filed: Nov. 12, 2015

(86) PCT No.: PCT/EP2015/076483
§ 371 (c)(1),
(2) Date: May 11, 2018

(87) PCT Pub. No.: WO2017/080609
PCT Pub. Date: May 18, 2017

(65) Prior Publication Data
US 2018/0333939 A1    Nov. 22, 2018

(51) Int. Cl.
*B32B 27/12* (2006.01)
*B65D 65/40* (2006.01)
(Continued)

(52) U.S. Cl.
CPC .............. *B32B 27/12* (2013.01); *B32B 3/266* (2013.01); *B32B 5/024* (2013.01); *B32B 5/14* (2013.01);
(Continued)

(58) Field of Classification Search
CPC ......... B32B 27/12; B32B 27/32; B32B 27/06; B32B 37/12; B32B 38/0036; B32B 5/024;
(Continued)

(56) References Cited

U.S. PATENT DOCUMENTS 3,925,585 A * 12/1975 Aoyagi ................. G09F 3/0288
                                                      428/42.3
5,492,705 A *  2/1996 Porchia ................. B65D 33/01
                                                      383/103
(Continued)

FOREIGN PATENT DOCUMENTS

CL      200701336 A1    9/2007
CL      2008000056 A1   3/2008
(Continued)

OTHER PUBLICATIONS

EPO Translation of CN103935615 (Year: 2019).*
Google Patents Translation of CN103935615A (Year: 2019).*

*Primary Examiner* — Michael Zhang
(74) *Attorney, Agent, or Firm* — Murphy, Bilak & Homiller, PLLC (57) ABSTRACT

A packaging material (600) comprises a first sheet material (100) and a woven fabric (200), which are arranged one above the other and are connected to one another. The first sheet material (100) contains first regions (120), in which the first sheet material (100) is expanded locally, and second regions (110), in which the first sheet material (100) is not expanded locally. The first regions (120) are arranged in each case between two second regions (110) and run in a first direction. The woven fabric (200) comprises a thread (220), wherein part of the thread (220) runs in a direction which intersects the first direction.

15 Claims, 8 Drawing Sheets

(51) Int. Cl.
*B32B 5/14* (2006.01)
*B32B 3/26* (2006.01)
*B32B 5/02* (2006.01)
*B32B 27/06* (2006.01)
*B32B 27/32* (2006.01)
*B32B 37/12* (2006.01)
*B32B 38/00* (2006.01)

(52) U.S. Cl.
CPC ............. *B32B 27/06* (2013.01); *B32B 27/32* (2013.01); *B32B 37/12* (2013.01); *B32B 38/0036* (2013.01); *B65D 65/40* (2013.01); *B32B 2038/0088* (2013.01); *B32B 2250/40* (2013.01); *B32B 2307/51* (2013.01); *B32B 2307/54* (2013.01); *B32B 2323/10* (2013.01); *B32B 2439/00* (2013.01)

(58) Field of Classification Search
CPC ....... B32B 5/14; B32B 3/266; B32B 2307/54; B32B 2307/51; B32B 2250/40; B32B 2038/0088; B32B 2439/00; B32B 2323/10; B65D 65/40
See application file for complete search history.

(56) References Cited

U.S. PATENT DOCUMENTS

| | | | | |
|---|---|---|---|---|
| 6,471,402 B1* | 10/2002 | Burns | ................ | B65D 21/023 |
| | | | | 206/509 |
| 2003/0017771 A1* | 1/2003 | Kassner | ............... | E01C 11/165 |
| | | | | 442/48 |
| 2005/0124252 A1* | 6/2005 | Dort | ....................... | D04B 21/16 |
| | | | | 442/327 |
| 2008/0166533 A1 | 7/2008 | Jones et al. | | |
| 2009/0269564 A1* | 10/2009 | Karatzis | ................ | D04B 21/12 |
| | | | | 428/220 |
| 2013/0196098 A1* | 8/2013 | Frei | ........................ | B32B 5/022 |
| | | | | 428/35.2 |
| 2013/0202231 A1* | 8/2013 | Nowak | .................. | B32B 5/024 |
| | | | | 383/203 |
| 2014/0134910 A1 | 5/2014 | Mansfield | | |

FOREIGN PATENT DOCUMENTS

| | | | |
|---|---|---|---|
| CL | 2015001214 A1 | | 7/2015 |
| CN | 103935615 A | * | 7/2014 |
| EP | 0754544 A2 | | 1/1997 |
| JP | 2002500597 A | | 1/2002 |
| JP | 2007119006 A | | 5/2007 |
| JP | 2009520047 A | | 5/2009 |
| JP | 2009184697 A | | 8/2009 |
| JP | 2012035864 A | | 2/2012 |
| JP | 2015151635 A | | 8/2015 |
| KR | 20130141662 A | | 12/2013 |
| WO | 2009045737 A1 | | 4/2009 |

* cited by examiner

PACKAGING MATERIAL AND METHOD FOR PRODUCING A PACKAGING MATERIAL

The present invention concerns packaging materials as well as a method for producing packaging materials.

Typically, pre-expanded strips made of plastic materials are used for packaging of palettes, hay, straw, or the like. For example, materials such as polyethylene (PE) polyethylene having high density (high density polyethylene, HDPE), polyethylene having low density (low density polyethylene, LDPE) and other synthetic materials are used as such a packaging material. It may be necessary to pack the goods to be packed airtight on a palette. The used material should have a high tensile strength and should provide protection against weather influences, such as humidity. For example, agricultural products, such as hay or straw, are packed to large bales. Also raw cotton, garbage and waste can be packed to bales. This is for example done by exerting a pressure to the goods to be packed and by wrapping them with a net or another material. Then, a band that is for example formed from polyethylene can be wrapped around the bale.

SUMMARY

The present invention is concerned with the problem of how to provide an improved packaging material as well as a method for its production.

According to the present invention the problem is solved by the subject matter and the method of the independent claims. Preferable embodiments are indicated in the dependent claims.

A person skilled in the art will recognize additional features and advantages after reading the following detailed description and after considering the accompanying drawings.

BRIEF DESCRIPTION OF THE DRAWINGS

The accompanying drawings are provided in order to give a deeper understanding of embodiments. The drawings are incorporated into this application and are a part of the application. The drawings exemplify the main embodiments and serve together with the description for explaining the principles of the invention. Further embodiments and numerous intended advantages will be readily recognizable from completely reading the following detailed description. Elements of the drawings are not necessarily true to scale with respect to each other. Same numerals designate corresponding similar parts.

DETAILED DESCRIPTION

In the following detailed description reference will be made to the accompanying figures which form a part of the detailed description, and in which illustrations of specific embodiments are shown according to which the invention can be realized. In this regard a terminology referring to directions such as "upper side", "bottom", "front side", "back side", "front", "back", and the like will be used with respect to the orientation of the figures described in this context. Since the components of embodiments of the invention can be positioned in a plurality of different orientations, this directional terminology is only used for the purpose of illustration and is by no means limiting. Of course, further embodiments can be used and structural or logical modifications can be made without departing from the subject matter defined by the claims.

The description of the embodiments is not limiting. In particular, it is possible to combine elements of particular embodiments, which are described in what follows, with elements of different embodiments.

Figure 1A:
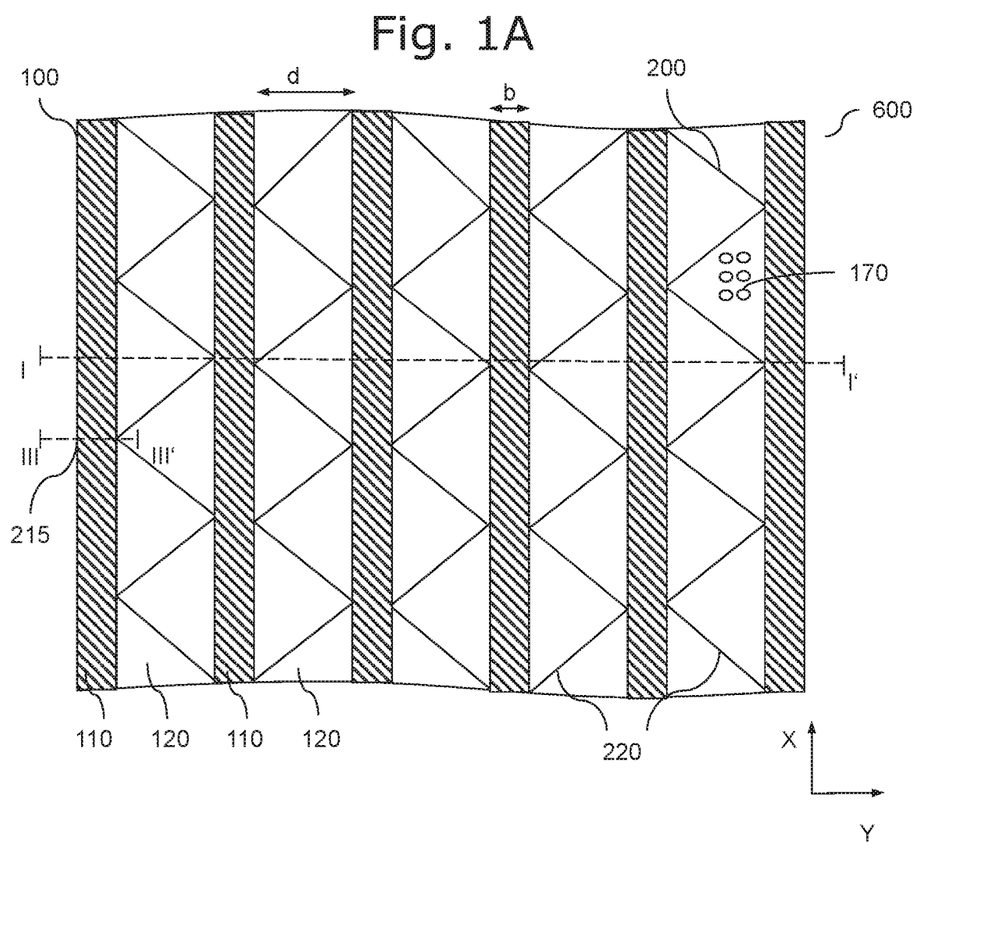
FIG. 1A illustrates a top view on a packaging material according to an embodiment.

FIG. 1A shows a schematic top view of a packaging material according to an embodiment. The packaging material 600 shown in FIG. 1A comprises a first foil or film 100 and a woven fabric 200 that are arranged on top of each other and connected with each other. The first foil 100 comprises first regions 120, in which the first foil is locally expanded, and second regions 110, in which the first foil 100 is not locally expanded. Each of the first regions 120 is arranged between two regions 110. First and second regions run each in a first direction, for example the X-direction. The woven fabric 200 comprises a thread 220, wherein a part of the thread 220 runs in a direction that intersects the first direction.

The first regions 120 may for example have a width d and the second regions 110 may have a width b, wherein the width is measured perpendicular to the first direction in both cases.

Typically, the foil 100 is rolled up on rolls and is unrolled for manufactured the packaging material. In this case the first direction, i.e. for example the X-direction, corresponds to the direction of unrolling or the direction of the flow of the foil. The Y-direction is oriented perpendicular to the direction of unrolling. In the first regions 120 the first foil 100 is expanded locally in the Y-direction, i.e. perpendicular to the direction of unrolling. The regions in which the foil is locally expanded are also called trenches (channels), while the non pre-expanded second regions 110 are called bands.

Figure 1B:
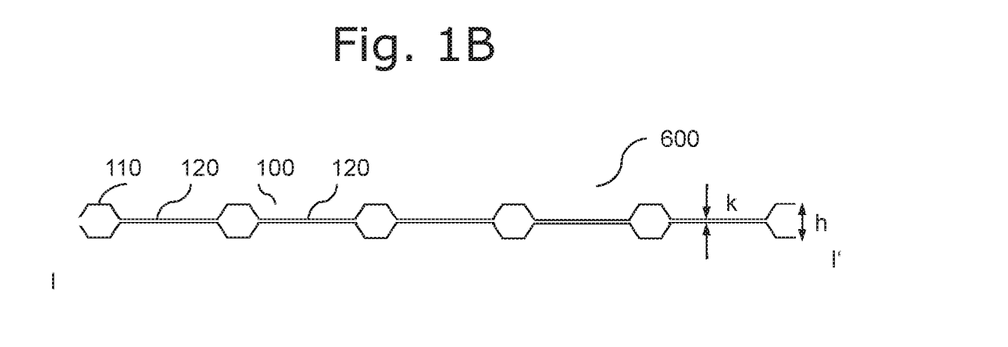
FIG. 1B illustrates a sectional view of the packaging material.

FIG. 1B shows a cross-sectional view of the packaging material for example between I to I' as indicated in FIG. 1A. The foil 100 that forms a part of the packaging material 600 comprises first regions 120 and second regions 110. In the second regions 110 the thickness h of the packaging material may be larger than the thickness k of the first foil in the first regions 120 in which the foil 100 is locally expanded. As will be explained in the following the increased thickness of the packaging material in the second regions 110 is caused on the one hand by the fact that in these regions the foil is not locally expanded. In addition, according to an embodiment the warp threads of the woven fabric 200 are located at this position.

The described packaging material comprises a woven fabric or net. This woven fabric may be elastic or may be not elastic.

For further explanation in what follows the following designations are used:

Net or woven fabric: thin bands that are for example formed or consist of Polyolefins such as for example LLDPE (linear polyethylene having low density), LOPE (polyethylene having low density), HDPE (polyethylene having high density), PVC (polyvinylchloride), EVA (ethylene vinyl acetate) or a similar plastic material, are processed to a net or woven fabric. The size of the woven fabric is arbitrary in principle, since the woven fabric can be manufactured in almost all desired dimensions.

Threads: The thin bands from which the net is composed, Before they are finally expanded, they have a thickness of 15 to 60 μm and a width of 1.5 to 10 mm.

Warp threads: The meshes stringed together in flow direction of the net such as to form a loop network.

Weft threads: The threads that have a zigzag interweavement and connect the warp threads to a net.

MD (machine direction): The flow direction of the net during manufacturing or of the foil during unrolling.

TD (transversal direction): The direction perpendicular to the flow direction or machine direction, Film: A roll made of a plastic material foil or a plastic material film such as for example polyethylene, HDPE, LLDPE or other thermoplastic polyolefins, which is rolled up and has a thickness of 7 to 60 μm and a width of 500 to 3000 mm. Its length depends on the properties of the manufacturing machine (extruder).

Trench (channel): Defines the first region of the foil which is pre-expanded in transversal direction and extends in its entire length along the foil.

Strip or band: Enforcement for example in pipe-like form that defines the area of the material (second region) that is not pre-expanded, extends in its entire length along the film, and has the original thickness of the foil.

Figure 2A:
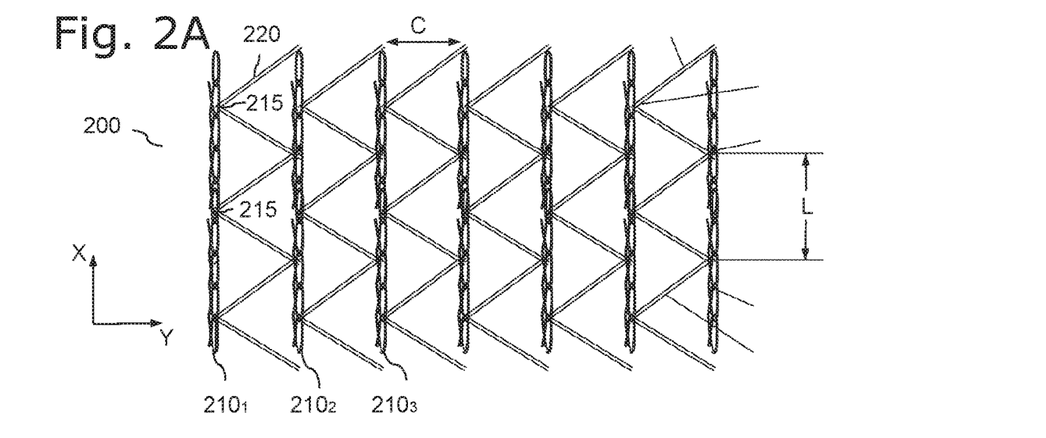
FIGS. 2A to 2C illustrate examples of a woven fabric.
Figure 2B:
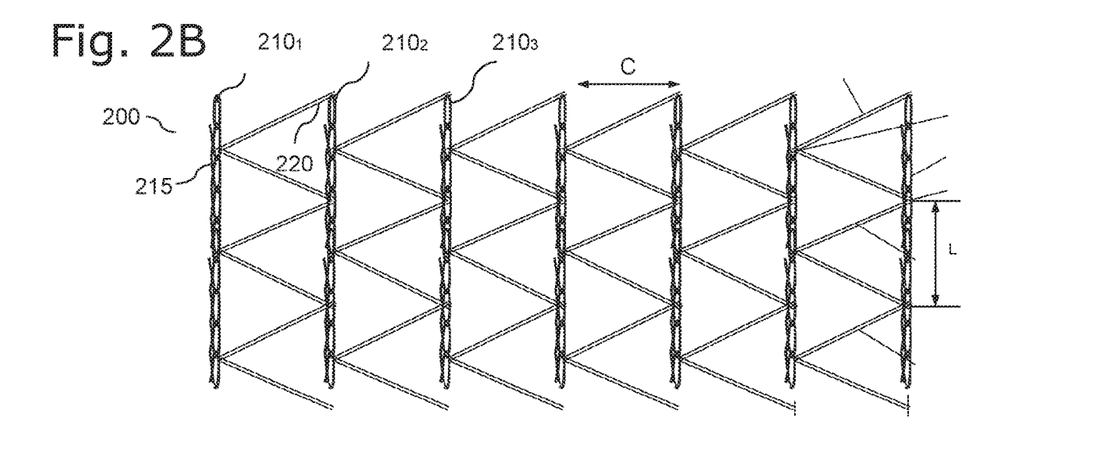
Figure 2C:
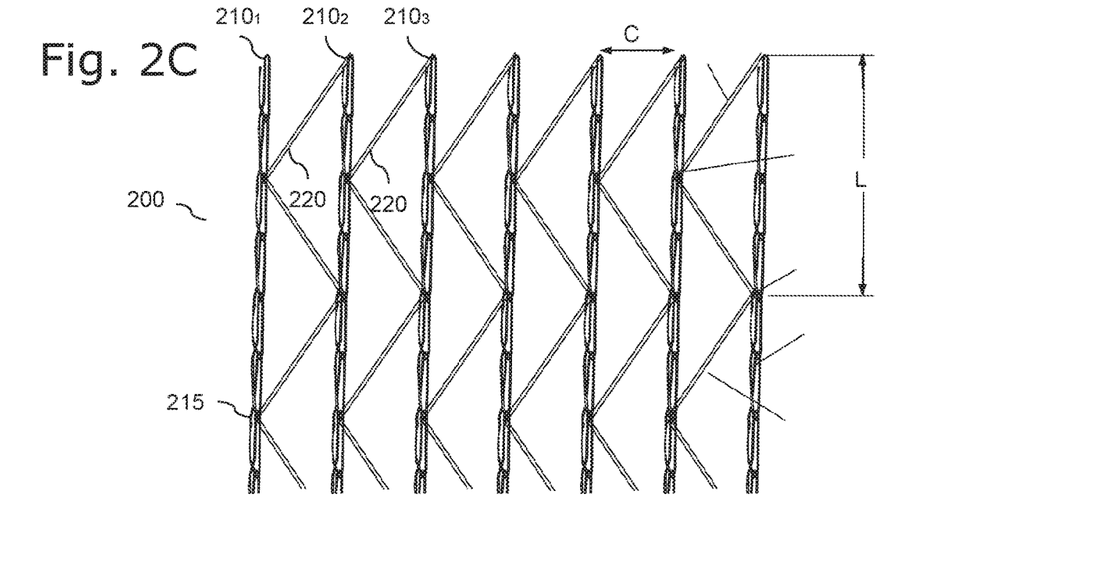

FIGS. 2A to 2C show examples of woven fabrics or nets that may form a part of the packaging material according to an embodiment. The woven fabric illustrated in FIGS. 2A to 2C is for example formed by a Raschel machine. Raschel machines are commonly known for net manufacturing. Such nets are for example used for packaging of palettes, straw, for forming of straw and grass bales or also for shadowing.

The woven fabric 200 comprises warp threads $210_1$, $210_2$, ..., $210_n$ that are for example formed by stringing together meshes along the X direction. A plurality of such warp threads is arranged along the width of the woven fabric. Weft threads 220 run between two neighbouring warp threads $210_1$, $210_2$, ..., $210_n$ and form a zigzag pattern. For example, the weft threads are guided between two neighbouring warp threads $210_1$, $210_2$, ..., $210_n$, such that they connect these with each other. Due to this a connecting technique is made possible that has no knots. At the connection points 215 the weft thread is respectively guided through the warp thread $210_1$, $210_2$, ..., $210_n$. Depending on the respective length of single weft thread segments in comparison to the distance C between the warp threads $210_1$, $210_2$, ..., $210_n$ and the distance L between neighbouring crossing points 215 of the weft thread 220 with the warp thread $210_1$ the elasticity of the woven fabric can be influenced.

For example, as illustrated in FIG. 2A an equilateral triangle may be formed from weft thread segments and warp thread segments. As shown in FIG. 2B the basis of the triangle may be smaller than the side length of the triangle.

As shown in FIG. 2C the basis of the triangle may also have a larger length L than the side length of the triangle, During connecting the first foil 100 and the woven fabric 200 these elements may be respectively aligned such that the warp threads $210_1$, $210_2$, $210_3$ are arranged along the second regions 110.

After connecting foil and woven fabric with each other, the weft threads 220 run across the first regions 120 that are expanded, while the warp threads $210_1$, $210_2$ overlap the second regions 210, The dimensioning of the first and second regions of the foil as illustrated in FIG. 1A is therefore carried out in accordance with the dimensioning of the woven fabric. For example, the distance between second regions 210 is adjusted such that this distance complies with the distance C between the warp threads $210_1$, $210_2$, ... $210_n$.

Warp threads and weft threads may each he formed from the same material. Alternatively, they may comprise different materials. For example, the warp and weft threads may be formed from polyolefins such as polyethylene, for example LOPE, HDPE, linear polyethylene having low density (linear low-density polyethylene, LLDPE), polyethylene having very low density (very-low-density polyethylene, VLDP), PVC or EVA. Alternatively, they may be formed from arbitrary other fibres that are typically used for such purposes. The strength of the fibres can be chosen such that the resulting packaging material has the desired tensile strength. Also, warp threads or weft threads may for example be realized by several parallel threads. For example, the woven fabric 200 may have a mass of 7 to 11 g/serial meter. The woven fabric 200 may for example have a typical width of fabric that is manufactured with a Raschel machine, This width may for example be 123 cm.

The first foil 100 may comprise a single layer made of a material, for example a plastic material, as explained above for example for the example of warp and weft threads, or may comprise a layered composite made of different materials, The foil may for example comprise several layers of different plastic materials or different olefins. The outer layers may for example comprise an adhesive layer, for example polyethylene having very low density (VLDPE) or linear polyethylene having low density (LLDPE).

Figure 3:
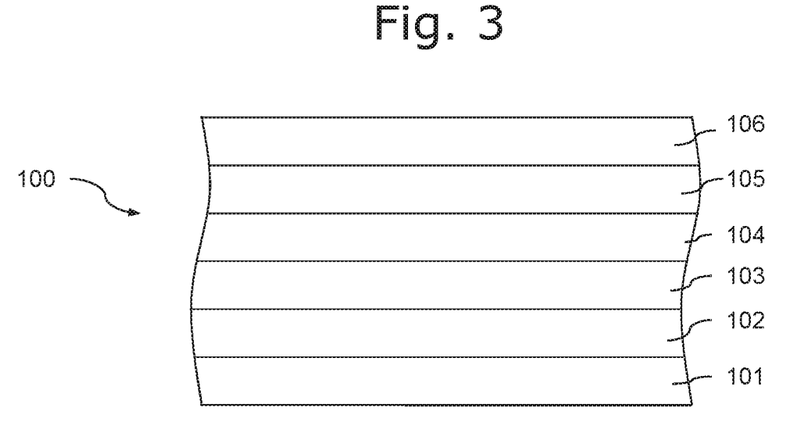
FIG. 3 illustrates a cross section through a foil.

FIG. 3 shows an example of a multilayer design of the first foil 100. The first foil 100 may for example comprise a first adhesive layer 101 and then four following different layers 102, 103, 104, 105 made of different olefins, The end may be formed by a second adhesive layer 106, The first and second adhesive layers 101, 106 may for example comprise a polyethylene having a very low density or linear polyethylene. Of course, also more layers may be used, for example up to 7 layers.

It is also possible to use less than four layers. The first foil 100 may have a layer thickness of 5 to 9 μm, But also a larger layer thickness may be used. The width of the foil may for example be 500 mm to 3 m or more, The material of the foil may be different from the material(s) of the woven fabric or may be the same material.

According to a further embodiment the packaging material may comprise a second foil 300 that is connected with the woven fabric 200 and the first foil 100 such that the woven fabric 200 is sandwiched between the first foil 100 and the second foil 300. Here, the second foil may comprise first regions 320 in which the second foil is locally expanded and second regions 310 in which the second foil is not locally expanded. In analogy to the first foil, the first regions run each between two second regions in a first direction. The composite of first foil, second foil, and woven fabric may in addition comprise arbitrary further layers such as for example adhesive layers and the like. The second foil may for example have the same design as the first foil. Alternatively it may have a different design such that the resulting packaging material has different properties at different surfaces. For example, the second foil can comprise different layers than the first foil, Further, on the outside of the first foil an adhesive layer may be provided, but not at the outer surface of the second layer or vice versa.

The first and/or the second foil may comprise micro holes 170. The expression "micro holes" comprises holes having a maximum opening diameter of less than 1 μm. For example, only the first foil or only the second foil may comprise micro holes while the respectively other foil does not have micro holes. In this case different properties of the packaging material can be provided on each surface of the composite. The micro holes 170 may for example be dimensioned such that they are penetrable by steam, but not by water. In this manner a breathable packaging material can be provided.

Figure 4A:
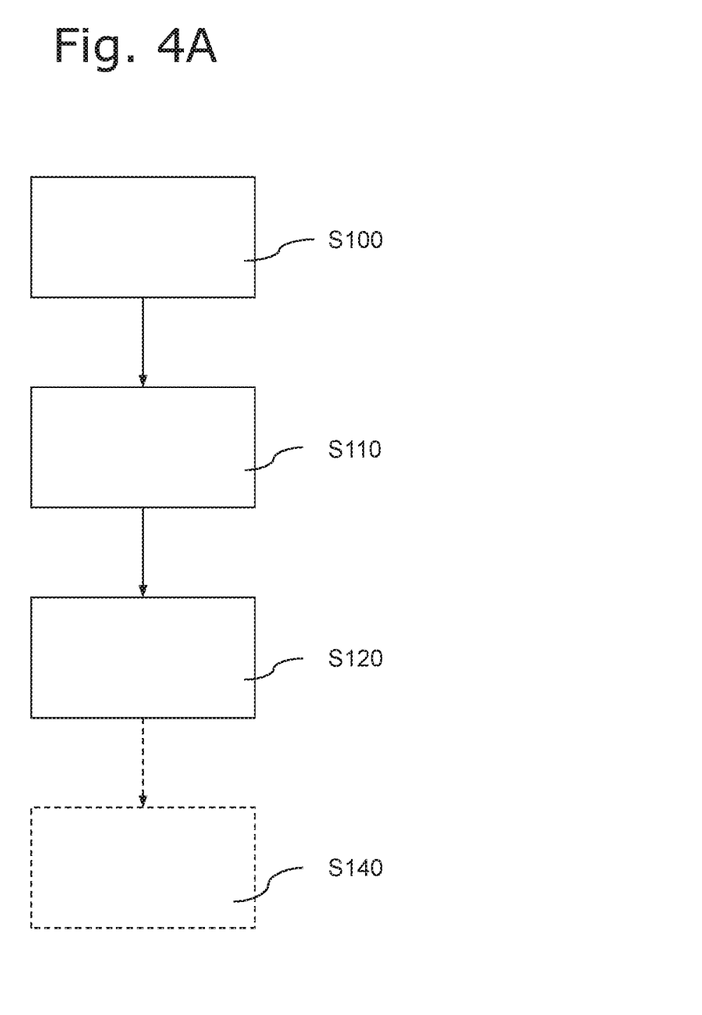
FIG. 4A illustrates a process diagram of a method according to an embodiment.

FIG. 4A illustrates a method for manufacturing packaging material according to an embodiment. The method comprises local pre-expanding (S100) of first regions of a first foil, wherein the first regions run in a first direction such that they define second regions that run each in the first direction, wherein each of the first regions is arranged between two second regions; arranging of a woven fabric (S110) that comprises a thread, wherein a part of the thread runs in a direction that intersects the first direction on top of the first foil; and connecting (S120) the woven fabric and the foil with each other, The method may further comprise applying (S140) of an adhesive onto the first foil.

Figure 4B:
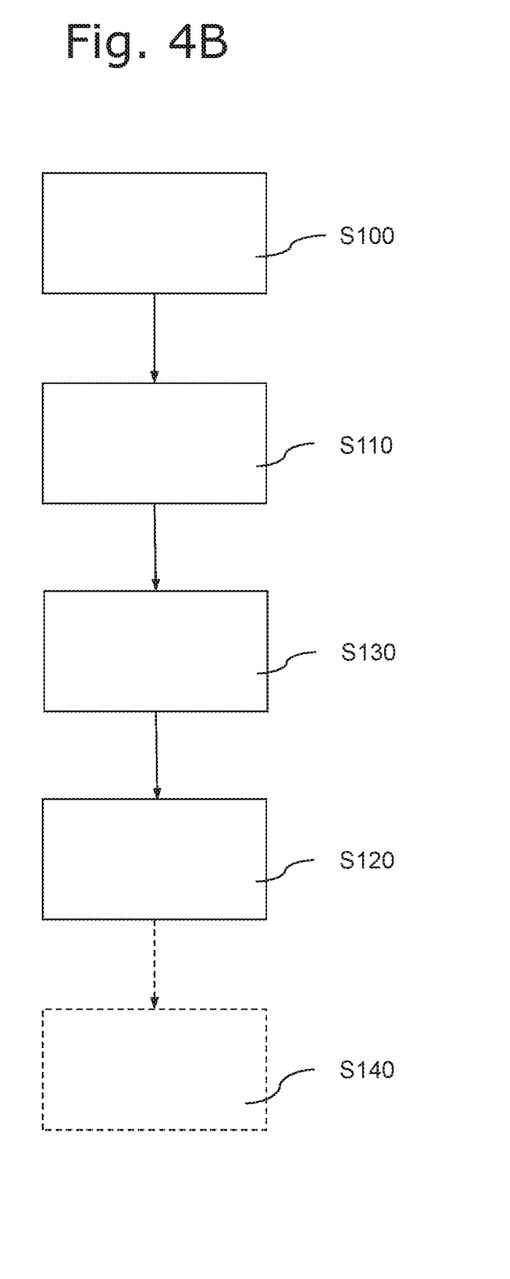
FIG. 4B illustrates a process diagram of a method according to further embodiment.

FIG. 4B illustrates a method for producing packaging material according to an embodiment. The method comprises local pre-expanding (S100) of first regions of a first foil, wherein the first regions run in a first direction such that they define second regions that run each in the first direction, wherein each of the first regions is arranged between two second regions; and arranging a woven fabric (S110) on top of the first foil, which woven fabric comprises a thread, wherein a part of the thread runs in a direction that intersects the first direction. The method comprises further: arranging (S130) of a second foil on top of the woven fabric and the first foil such that the woven fabric is arranged between first and second foil; and connecting (S120) the woven fabric and the foil with each other. The method may further comprise applying (S140) of an adhesive onto the first foil and/or second foil.

Figure 5A:
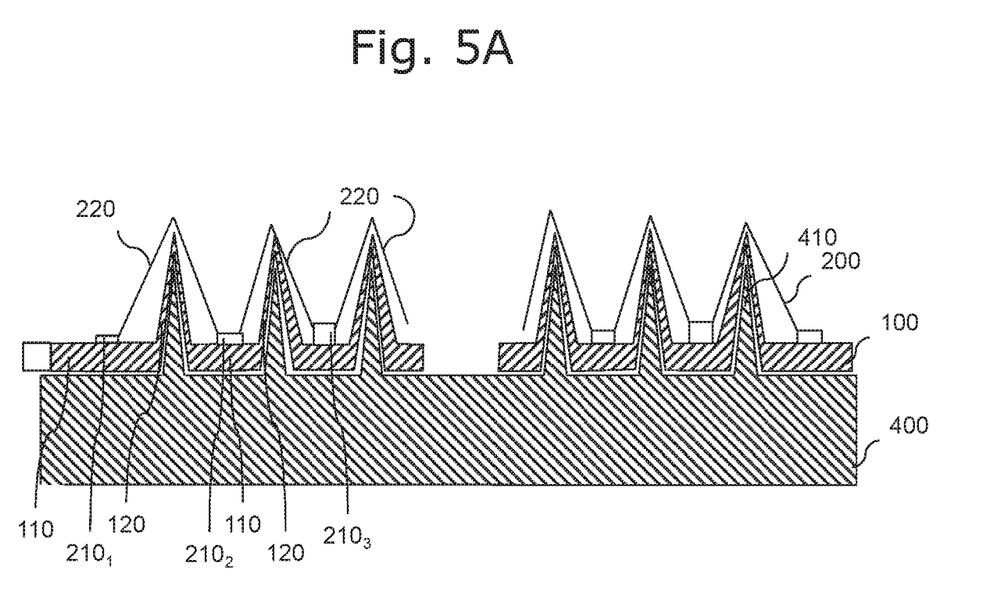
FIG. 5A illustrates a cross section of components of the packaging material during its production.

In order to manufacture the described packaging material, first regions of a first foil 100 are locally expanded. This may for example be achieved by putting the foil on a shaping element 400. The shaping element 400 comprises protruding regions 410 that protrude perpendicular to the planar surface. For example, the protruding regions 410 may have a triangular shape and extend for example into a height of 15 to 35 mm. Of course, the height h may be chosen arbitrarily according to the width of the expanded regions to be achieved. But the protruding regions 410 may also have a different form and may for example be rectangular or in semicircular shape. If necessary, height, pressure, or stress may be used to support the generation of the expanded regions. Then, the woven fabric is placed on the foil. Since the foil has been put onto the shaping element 400 the second regions that have not been expanded and in which the warp threads $210_1$, $210_2$ of the woven fabric are to be arranged are in the "local minimum of potential energy" of the foil. This simplifies a relative positioning of the woven fabric 200 with respect to the foil 100. Afterwards, the film is expanded together with the woven fabric in flow direction such that it becomes thinner and obtains final stability, By using a controlled expansion also the final elasticity can be adjusted, In this final expansion process the material in the first regions that have been formed by the pre-expansion process tries to align its molecular chains. As a consequence thereof, the material forms due to the difference in thickness pipe-shaped strips in the second regions 110, in which the warp threads $210_1$, $210_2$ of the fabric are enclosed. This is illustrated in more detail in FIG. 6A and will be described later. Due to this expansion process in the machine direction (X-direction) the foil 100 and the woven fabric 200 are connected with each other.

Figure 5B:
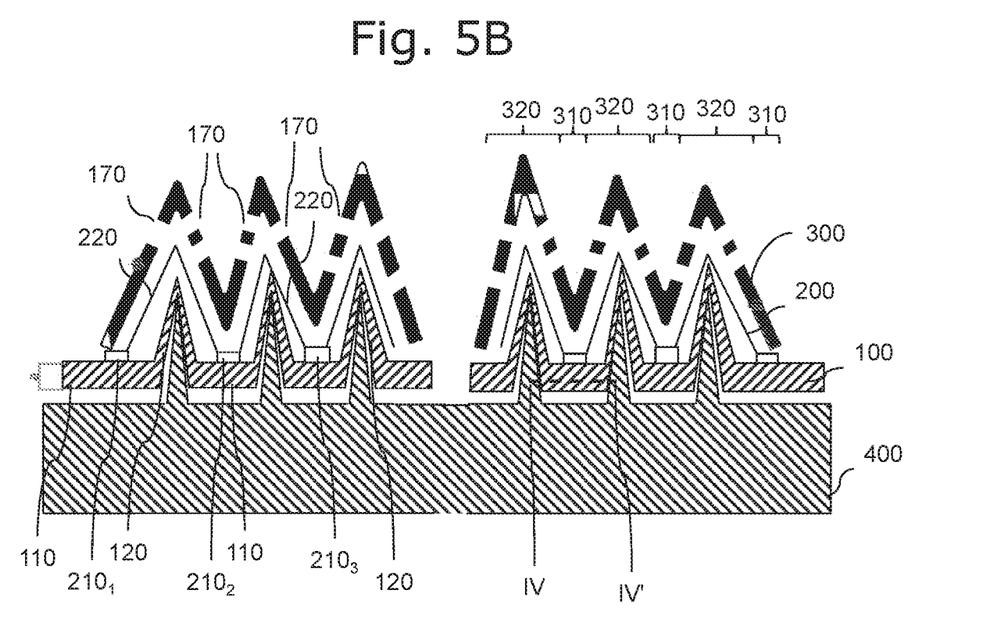
FIG. 5B illustrates components of the packaging material during its production.

This can be achieved in analogous manner for the system having two foils. FIG. 5B illustrates a setup that is similar to the setup illustrated in FIG. 5A, in which setup a second foil 300 is additionally put onto the setup. The second foil 300 may be pre-expanded locally by putting it onto the shaping element 400. After expansion in the flow direction, the layered structure having first foil 100, woven fabric 200, and second foil 300 is obtained. In FIG. 5B micro holes 170 are exemplarily shown. According to an embodiment these may be present in the first and/or the second foil 100, 300.

Figure 7:
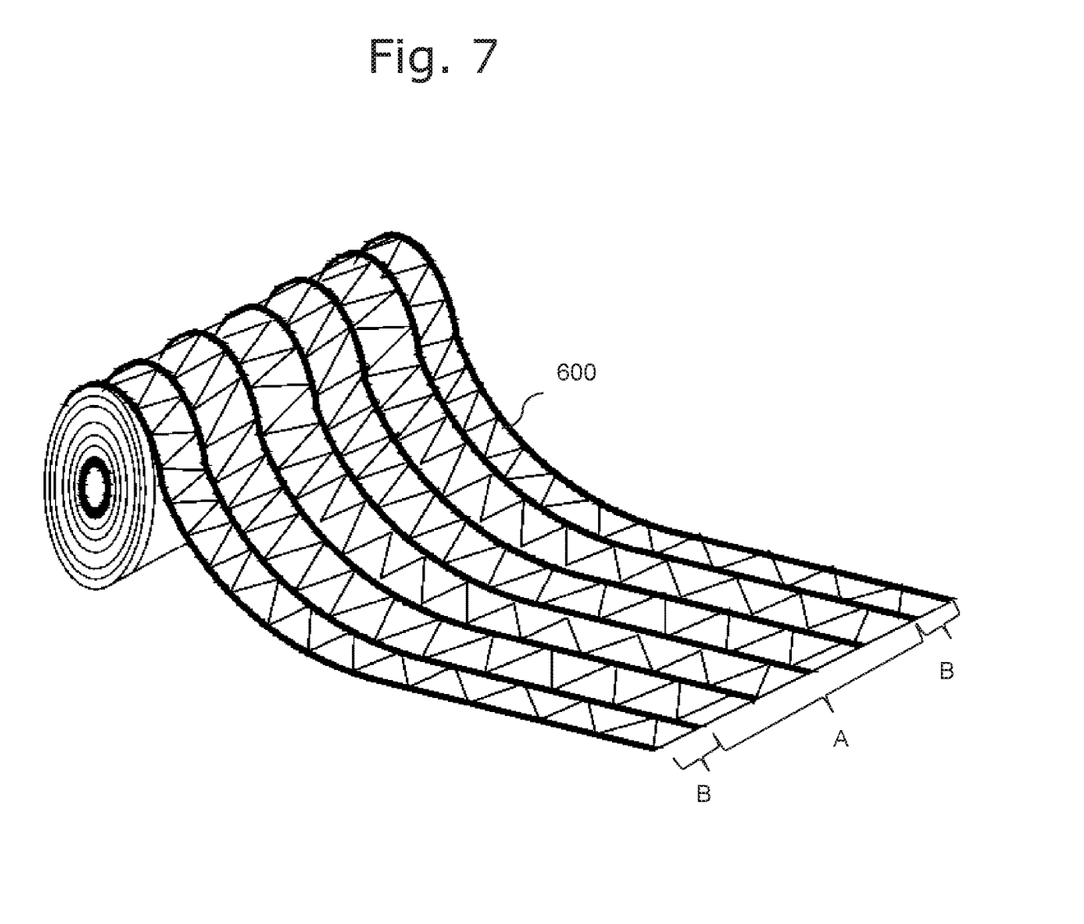
FIG. 7 illustrates a roll with a rolled up packaging material according to an embodiment.

Finally, the finished packaging material is rolled up in rolls of 700 to 3000 m as for example illustrated in FIG. 7.

Alternatively, the layers may also he put together by thermoforming or thermo-gluing.

For example, first foil 100, woven fabric 200, and second foil 300 are put onto each other as shown in FIG. 5B, heated, and afterwards pressed together such that they become chemically connected with each other, in particular in areas in which the warp threads $210_1$, $210_2$ are located. The first foil 100 and the second foil may for example be put on top of each other and connected to each other as illustrated in FIG. 5B. However, they may also be put on top of each other as planar layers having no pre-expansion, be heated, and consecutively pressed together. Alternatively, before assembling the single components a thin adhesive layer may be provided on the upper side of the first foil 100 or at the lower side of the second foil 300. The layers can then be connected with each other by the adhesive or by the adhesive and heat. According to an embodiment the packaging material 600 may comprise a first foil 100, a woven fabric 200, and a second foil 300 that are arranged on top of each other and are connected with each other. The woven fabric may comprise warp threads $210_1$, $210_2$, ..., $210_n$ in the flow direction of the woven fabric and weft threads 220, wherein the weft threads 220 connect two neighbouring warp threads $210_1$, $210_2$ with each other and form due to this a zigzag pattern. At the positions of the warp threads $210_1$, $210_2$, ..., 210n the packaging material is locally reinforced.

According to a further embodiment an adhesive layer may be applied after assembling the composite, For example, the adhesive layer 500 may be applied onto the packaging material comprising one foil 100 or onto the packaging material comprising two foils 100, 300. The adhesive layer may for example be applied to only one of the two foils 100, 300 or onto both foils. If the adhesive layer is applied only to one of the two foils 100, 300, different adhesive properties will result for the two surfaces of the packaging material, The layer thickness of the adhesive layer may for example be 2 to 8 μm, preferably approximately 3 μm.

As a result, a reinforced or non-reinforced packaging material is obtained that has good gripping characteristics with respect to the materials to be packaged. The components of the packaging material can be produced by simple methods in a cost-efficient manner such that the packaging material can be manufactured cost-efficiently and easily. Due to the special combination of foil and woven fabric, the packaging material has a high tensile strength and a large elasticity at a relatively low mass. For example the mass may be 3.5 g/serial meter to 130 g/serial meter, for example 24 to 40 g/serial meter. A foil made of polyethylene with low density (LDPE) that has a thickness of 25 μm and a width of 1500 mm may for example have a tensile strength that corresponds approximately to 100 kg. Due to the combination with a woven fabric a packaging material can be provided that has a tensile strength that corresponds approximately to 500 kg. Due to its high tensile strength the packaging material can be used for heavy goods to be packaged such as palettes. The composite made of foils and woven fabric, wherein the foils can in turn again comprise several layers, is for example connected to each other inseparably, i.e. there is no separation between the single layers.

In addition, it is not necessary to take specific measures in order to guarantee that the foil edge holds on a palette or on a hay or straw bale. The film has adhesive characteristics. For example, the strength of the adhesive may be adjusted such that the film is kept on the material to be packaged and unwinding of the packaging material from the good to be packaged is avoided.

According to an embodiment the woven fabric may be broader than the foil. For example, the woven fabric may have an extension width of 12% to 160% with reference to the width of the foil. In arranging the foil and the woven fabric, for example two warp threads may be left free on each side. Using packaging material in which two warp threads on each side remain free, for example cylinder-shaped packaging goods such as straw and hay bales can be packaged. In this case the cylinder-shaped outer surface (outer surface) of the cylinder is wrapped by the part of the packaging material that contains the foils 100, 300. The part of the packaging materials, in which the warp threads on the lateral edge are not encompassed by the foil, cover the planar lateral surfaces of the cylinder. In this manner packaging goods can be packaged very quickly without loss of material. Since the packaged straw bale is not covered by foil on its planar lateral surfaces, but only by the woven fabric, breathable storage of the packaging material is possible such that it can be conserved for a long time.

According to a further interpretation the packaging material 600 comprises a first foil 100 and a woven fabric 200 that are arranged on top of each other and that are connected with each other. The first foil 100 comprises reinforcement regions 110 that run in a longitudinal direction of the packaging material, for example the X-direction. The woven fabric comprises warp threads $210_1$, $210_2$ that run in the first direction. The warp threads $210_1$, $210_2$ are arranged along the reinforcement regions 110. The reinforcement regions 110 correspond therefore to the second regions in which the first foil 100 is not locally pre-expanded.

Figure 6A:
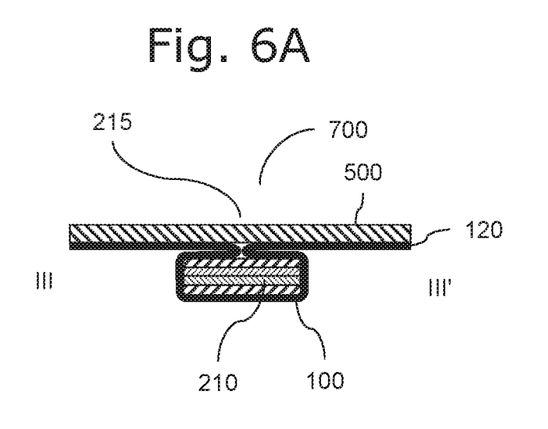
FIG. 6A illustrates a schematic, enlarged sectional view through a region of the packaging material.

FIG. 6A shows an enlarged cross-sectional view of the connection point 215 for example between III and III' as illustrated in FIG. 1A. As illustrated, the first foil 100 forms, in particular in the second region 210, a kind of a tube- or pipe-shaped section in which the warp thread 210 is received. Due to this, a firm connection between foil 100 and woven fabric 200 is provided and the reinforcement region 700 can be formed. Optionally, an adhesive layer 500 may be provided over the foil 100

Figure 6B:
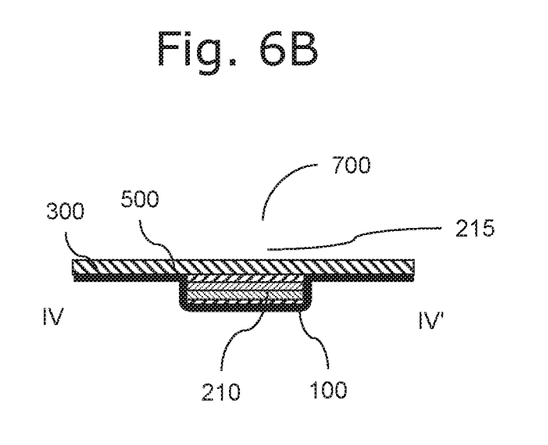
FIG. 6B illustrates an enlarged view of a region of the packaging material.

In the embodiment illustrated in FIG. 6B a laminate is formed from first foil 100, woven fabric 200, and second foil 300. The warp threads 210 are sandwiched between the first foil 100 and the second foil 300. At the position of the warp threads 210 reinforcement regions 700 may be defined. Also in this case an adhesive layer 500 may optionally be provided on the upper side or outside of the second foil 300.

According to the embodiments shown in FIGS. 6A and 6B the packaging material comprises for example a first foil 100 and a woven fabric 200 having a plurality of reinforcement regions 700 that extend in a first direction along the length of the packaging material. The reinforcement regions 700 may for example comprise tube-like regions of the first foil 100, wherein a warp thread of the woven fabric is arranged inside the tube-like region. According to an embodiment the packaging material 600 may further comprise a second foil 300. The reinforcement region 700 may respectively be formed at the position of the warp threads 210 by the combination of the first: foil 100, the warp thread 210, and the second foil 300.

FIG. 7 shows an example of a roll containing rolled up packaging material. For example, about 700 to 3000 m packaging material can be rolled up onto such a roll. Due to the low mass of the packaging material many meters of packaging materials can be rolled up on a roll. The width of the obtained packaging material 600 may for example be 123 cm. The width corresponds then to the usual width of a woven fabric 200 that has been produced with a usual Raschel machine. In FIG. 7 the region A denotes the region of the packaging material in which first foil 100 and woven fabric 200 are arranged on top of each other. In region B only the woven fabric without foil is present.

The invention claimed is:

1. A packaging material, comprising:
a first foil and a woven fabric arranged one above the other and connected to each other,
wherein the first foil comprises a plurality of first regions, in which the first foil is expanded locally, and a plurality of second regions, in which the first foil is not expanded locally,
wherein each of the first regions is arranged between two second regions,
wherein the first and the second regions run each in a first direction,
wherein the woven fabric comprises a thread,
wherein a part of the thread runs in a direction that intersects the first direction,
wherein the woven fabric comprises warp threads that run in the first direction,
wherein the thread runs between two neighbouring ones of the warp threads and forms a zigzag pattern,
wherein the warp threads are arranged at positions of the second regions.

2. The packaging material of claim 1, wherein the first foil comprises micro holes.

3. The packaging material of claim 1, wherein the first foil is formed as a continuous foil having no holes.

4. The packaging material of claim 1, wherein the first foil comprises several layers made from different plastic materials.

5. The packaging material of claim 1, wherein the second region of the first foil has a thickness of 7 to 60 μm.

6. The packaging material of claim 1, further comprising:
a second foil,
wherein the second foil comprises first regions, in which the second foil is expanded locally, and second regions, in which the second foil is not expanded locally, wherein each of the first regions of the second foil is arranged between two second regions of the second foil,
wherein the woven fabric is arranged between the first foil and the second foil.

7. The packaging material of claim 6, wherein the first foil is formed from a material different from the second foil.

8. The packaging material of claim 6, further comprising an adhesive applied only onto an outer side of the first foil.

9. The packaging material of claim 6, wherein the first foil comprises micro holes and the second foil is formed as a continuous layer having no micro holes.

10. The packaging material of claim 1, wherein the woven fabric has a larger width than a width of the first foil, wherein the widths are measured perpendicular to the first direction.

11. A method for producing of packaging material, the method comprising:
locally expanding a plurality of first regions of a first foil, wherein the first regions running in a first direction such that a plurality of second regions is defined, wherein the first and second region run each in the first direction, wherein each of the first regions is arranged between two second regions, the first foil not being expanded locally in the second regions;
arranging a woven fabric above the first foil, the woven fabric comprising a thread and warp threads, a part of the thread running in a direction that intersects the first direction, the warp threads running in the first direction, the thread running between two neighbouring ones of the warp threads and forming a zigzag pattern; and
connecting the woven fabric and the first foil with each other, the warp threads being arranged at positions of the second regions.

12. The method of claim 11, further comprising:
arranging a second foil above the woven fabric such that the woven fabric is arranged between the first foil and the second foil.

13. The method of claim 11, wherein the first foil is expanded together with the woven fabric in a second direction that is perpendicular to the first direction.

14. The method of claim 11, wherein connecting the woven fabric and the first foil with each other comprises a thermal treatment.

15. The method of claim 11, further comprising:
applying an adhesive onto the first foil.

* * * * *